(12) United States Patent
Montminy et al.

(10) Patent No.: US 6,952,438 B2
(45) Date of Patent: Oct. 4, 2005

(54) THREADED CONNECTION FOR CARBON AND/OR GRAPHITE ELECTRODE COLUMNS

(75) Inventors: John Montminy, Hickory, NC (US); L. Allen Wyatt, Morganton, NC (US); Richard L. Harris, Morganton, NC (US)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 10/699,134

(22) Filed: Oct. 31, 2003

(65) Prior Publication Data

US 2005/0094701 A1 May 5, 2005

(51) Int. Cl.[7] .................................................. H05B 7/14
(52) U.S. Cl. ...................................................... 373/92
(58) Field of Search ........................ 373/88–100; 411/3, 411/14; 403/28, 292, 296, DIG. 5

(56) References Cited

U.S. PATENT DOCUMENTS

| | | | | |
|---|---|---|---|---|
| 2,957,716 A | * | 10/1960 | Kaufmann et al. | ........... 373/92 |
| 2,970,854 A | * | 2/1961 | Johnson | ........................ 373/92 |
| 3,708,601 A | * | 1/1973 | Kozak | .......................... 373/91 |
| 4,076,064 A | | 2/1978 | Holmes | |
| 4,159,184 A | * | 6/1979 | Burwell | ........................ 373/92 |
| 4,167,643 A | | 9/1979 | Charnock | |
| 4,266,590 A | | 5/1981 | McKewan | |
| 4,349,910 A | * | 9/1982 | Belz | ............................. 373/91 |
| 4,679,206 A | * | 7/1987 | Burwell | ........................ 373/91 |
| 5,282,707 A | * | 2/1994 | Palm | ............................. 411/3 |
| 5,575,582 A | | 11/1996 | Frastaci et al. | |

* cited by examiner

Primary Examiner—Tu Hoang
(74) Attorney, Agent, or Firm—Laurence A. Greenberg; Werner H. Stemer; Ralph E. Locher

(57) ABSTRACT

A threaded connection is secured against loosening/unscrewing for columns of carbon and/or graphite electrodes. The electrodes are connected in columns with threaded connection elements, i.e., carbon connecting pins. At least one part has a wedge ramp on the root of the thread winding. When the components of the threaded connection are screwed together, the crests of the thread windings of one part abut with the wedge ramps of the other threaded connection component. A contact line is created, possibly multiple sections of a contact line. When the parts are screwed together, all forces are transferred from one part to the other only via the contact line. In a special case, the contour of the thread winding along whose root the wedge ramp is running is reduced e.g. to a connecting line between two wedge ramps located one above the other in the cross-section.

15 Claims, 6 Drawing Sheets

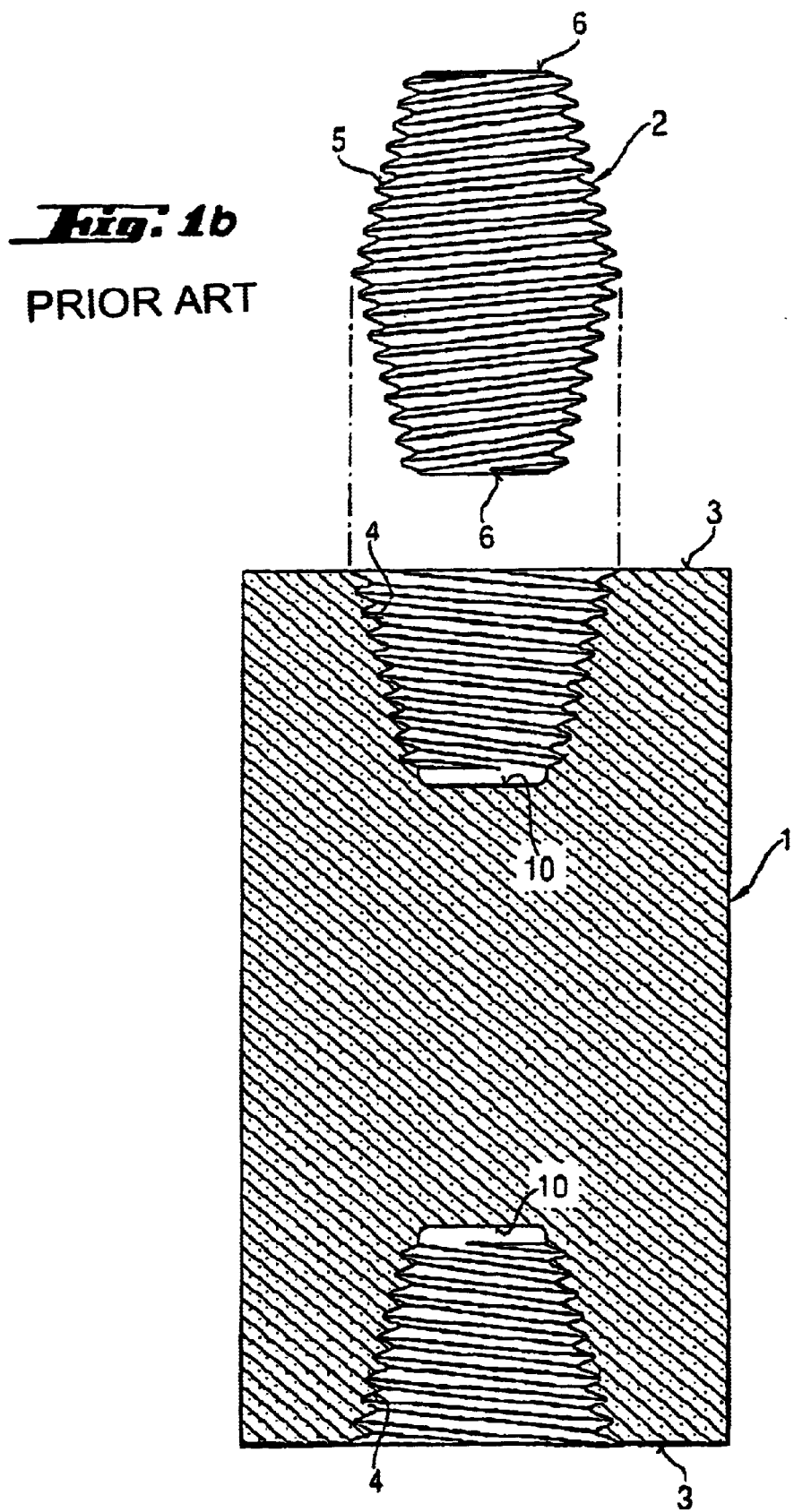

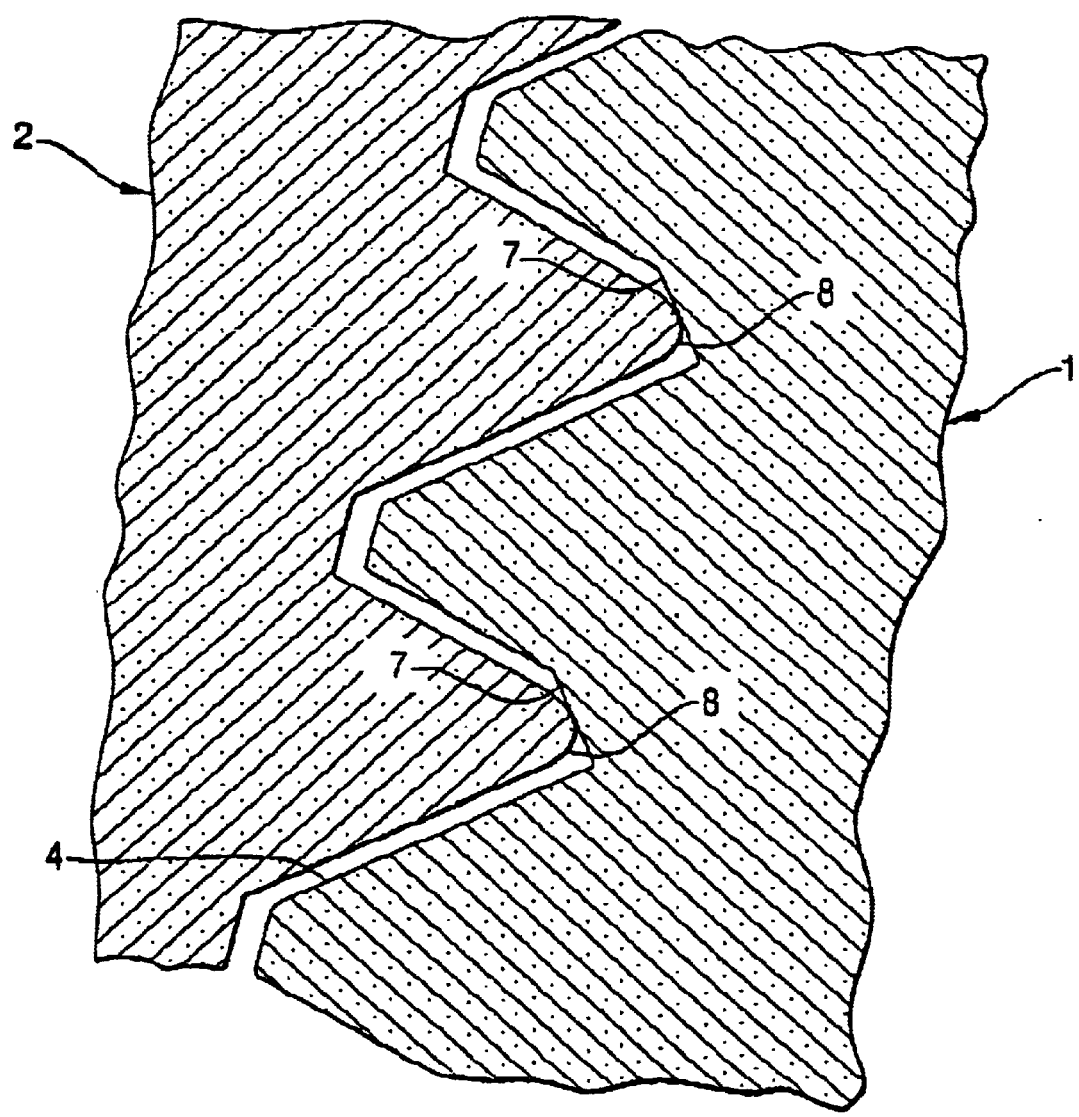

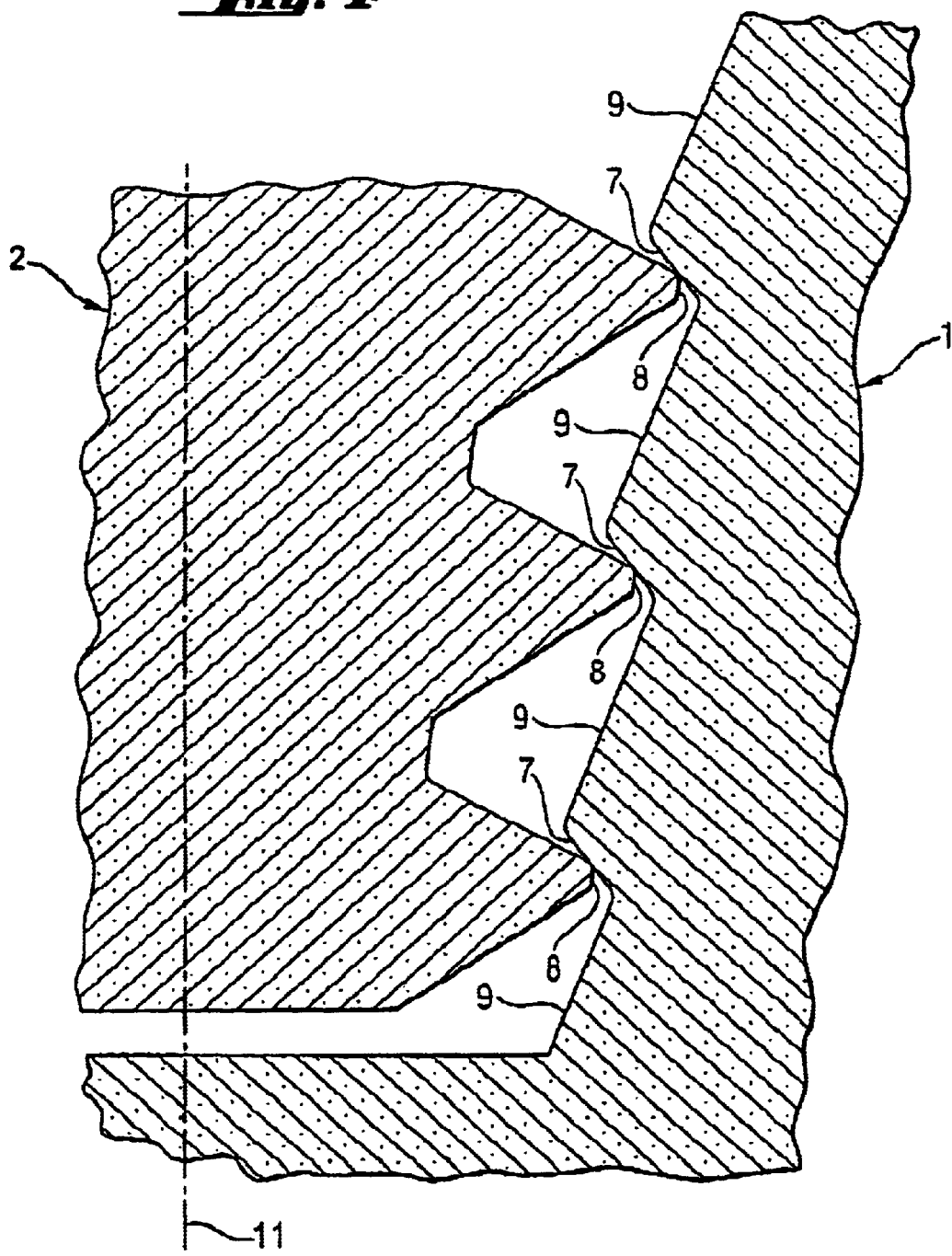

THREADED CONNECTION FOR CARBON AND/OR GRAPHITE ELECTRODE COLUMNS

BACKGROUND OF THE INVENTION

Field of the Invention

The invention relates to a variant of a threaded connection including an outer part with an internal thread and an associated inner part with an external thread. The respective threads of the parts have a uniform lead. The individual thread has a substantially V-shaped profile and at least one of the threads is furnished with a wedge ramp at the thread root wherein when the inner and outer parts are screwed into one another the thread crests of the one threaded connection part abut with the wedge ramps at the root of the thread of the other connection part.

The invention further relates to another variant or special configuration of a threaded connection including an outer part with an internal thread and an associated inner part with an external thread. The respective threads of the outer and inner parts have a uniform lead. The individual thread of the one part has a substantially V-shaped profile and the other part is furnished with an encircling wedge ramp in the nature of a thread. When the inner and outer parts are screwed into one another the thread crests of the one threaded connection part abut with the encircling wedge ramp in the nature of a thread of the other connection part.

The invention further relates to the use of both variants of such threaded connections as connections for carbon, semi-graphite or graphite electrodes that are locking, load-bearing, and not susceptible to unscrewing, especially under dynamic loading.

The technique of manufacturing carbonized or graphitized carbon, also including carbon electrodes and connecting pins therefor, has been known in the art for over a hundred years and it is applied on a large industrial scale. Accordingly, it has been refined in many respects and optimized in terms of costs. One description of this technology may be found in ULLMANN'S ENCYCLOPEDIA OF INDUSTRIAL CHEMISTRY, Vol. A5, VCH Verlagsgesellschaft mbH, Weinheim, 1986, pp. 103–113.

An arc furnace contains at least one column of carbon electrodes. The upper end of such a column is retained by a bracket, through which the electrical current for the electrode column is also supplied. When the furnace is in use, the electric arc passes from the bottom tip or lower end of the column into the metal for melting that is located in the furnace. The electric arc and the high temperatures in the furnace cause the bottom end of the electrode column to burn away slowly. The shortening of the electrode column is compensated in that the column is advanced progressively into the furnace, and if necessary a further electrode is screwed onto the top end of the column. If necessary, a partially burned off column consisting of several electrodes and their connecting pins may also be removed from the bracket as a single unit and replaced by a fresh column of sufficient length.

Individual carbon electrodes are screwed onto a column already situated in the furnace, or electrodes are screwed to a fresh column either by hand or with a machine. Particularly in the case of electrodes having a large diameter of 600 mm or more, significant forces and turning moments or screwing effort must be applied in order to ensure that an electrode column will not come apart. Secure attachment of a column is vitally important for the functioning of an arc furnace.

The secure attachment of a column is threatened during transport, but particularly when a furnace is in operation. When a furnace is in use, considerable flexing moments are exerted repeatedly on the electrode column due to the oscillation of the furnace casing including the column, or the column is subjected to constant vibration; the column is exposed to impacts from the charge material, which also places stresses on the secure attachment of the column. All such stresses—repeated flexing moments, vibrations and impacts—are capable of causing the threaded connection of electrodes to loosen. Loosening must be considered to be the result of unavoidable and/or undesirable processes.

For the sake of better understanding, the consequences of an electrode column coming loose while the furnace is in operation will be described:

Loosening of the column is an indication that the tightness of the screw attachment is reduced. As a result, the compressive forces on the contact surfaces of adjacent column elements are also lessened. Loosening may progress until some contact surfaces become physically separated from each other.

As a result, the electrical resistance in the connection is increased. Those surfaces that are still in contact are subjected to greater current density. The higher current density leads to localized thermal overheating.

When a screw connection becomes loose, the connecting pin is usually exposed to a high thermal and mechanical load. Ultimately, mechanical failure of the connecting pin due to overheating and mechanical loading is to be expected. As a result, the lower end of the electrode column breaks off and falls into the molten steel, the electric arc is interrupted and the smelting process is terminated.

In order to counter the problems of inadequate attachment and poor current transfer from one part of the electrode column to the next, a number of very different approaches have been instituted. The practice described in the following is also implemented in the steelworks.

U.S. Pat. No. 4,167,643 described that the connecting pin between two graphite electrodes had a lower coefficient of thermal expansion than the two electrodes. As temperatures rose—in steelworks operations, temperatures well above 1500° C. are reached—the electrode sections expanded more than the connecting pin. This caused additional, heat-induced tightening between the connecting pin and the electrodes, which were considered to be a safety cut-out for the threaded connection. However, it was also evident that the thermally induced forces placed the flanks of the thread windings under severe stress.

U.S. Pat. No. 5,575,582 described the use of a tapered cutout pin in addition to the connecting pin between two graphite electrodes. With the electrode column in the screwed state, the arrangement ensured that the cutout pin in a recess extending about half through the contact surfaces of two adjacent electrodes fell out of the recess in the respective upper electrode of the column and into the recess in the corresponding lower electrode in the column. The recess in the lower electrode was conformed as a curved channel that traced an arc having constant radius about the central longitudinal axis of the electrode. When the threaded connection became loose, the cutout pin was able to slide along the channel until it was blocked at the farther end. The cutout pin that had fallen down into the recesses thus prevented further distortion and consequent loosening of the two electrode sections. Depending on the length of the curved channel and the torsional path about the central longitudinal axis of the electrode that the cutout pin traversed therein, the threaded connection was still capable of becoming quite loose. This had deleterious effects on the transfer of current through this threaded connection and in terms of localized overheating at this connection.

In other fields too, attempts have been made to resolve the problem of fixtures becoming loose. In German published patent application DE 41 37 020, self-protecting fixtures were described such as screws and nuts made from materials not further described. The fixture was furnished with a number of knob-like projections in the frontal surface that cooperated with a structural member. The projections were conformed as pyramids or cones having a height of less than 1 mm, wherein the angle at the tip of the pyramid or cone was at least 90°. The pyramids or cones were intended to be impressed into the surfaces of the structural members to be braced upon screwing tight, thus preventing the fixtures from coming unscrewed. Reference was had to "setting" and the associated reduction in prestressing (see col. 2, line 9, of the German application). The pyramids or cones were distributed evenly over the frontal surface of the fixture. The fixture had no specifically structured contact surface, and accordingly no front tension direction with special effectiveness.

With reference to screwing columns of carbon electrodes, it should be noted that macroscopic knobs on the contact surfaces of the electrodes or connecting pins would be smashed during screwing because of the ceramic and thus brittle nature of the carbons. It is even possible that substantial pieces might be ejected from the frontal surfaces of the column elements.

A different approach to preventing fixtures from becoming loose was described in the U.S. Pat. No. 4,076,064 (1978). A wedge ramp was introduced at the root of the thread winding of the one component of a threaded connection. When both components of the threaded connection were screwed together, the crests of the thread windings of the threaded connection component without the wedge ramp abutted with the wedge ramp at the root of the thread winding of the other component. The abutment of the thread winding crests of the one threaded connection component with the wedge ramp at the root of the thread winding of the other component had the effect of locking both components. This locking effect was improved if both components were made from appropriately selected materials. It was helpful if the bolt in the threaded connection was made from a harder, less ductile material than the associated nut. Since the materials were not described in greater detail, the logical assumption was that for the purposes of this patent, metallic materials were concerned. No indication was given that this type of threaded connection was also created using materials made from synthetically produced carbons, nor for tapered threaded connections as are commonly used to connect carbon and/or graphite electrodes as described herein.

The element having the wedge ramp at the root of the thread winding was also dealt with in U.S. Pat. No. 4,266, 590 (1981). In that case, heights of the thread windings in the nut and the bolt were slightly different. As a result, for each thread winding the thread winding crests of the threaded connection component without the wedge ramp were located at different relative positions in the clear cross-section of the thread winding with the wedge ramp on the thread winding root of the other component. According to this patent specification, the locking effect that was achieved by the thread crests striking the wedge ramp was further reinforced by a jamming effect due to the differing heights of the thread windings in the two threaded connection parts. No indication was given that this type of threaded connection was also created using materials made from synthetically produced carbons, nor for tapered threaded connections as are commonly used to connect carbon and/or graphite electrodes as described herein.

In the practical running of a steelworks, one attempts to screw the electrodes together as firmly as possible. As was indicated in the preceding, the forces, turning moments and screwing effort that can be applied manually are limited. These forces may be increased considerably using machinery, but such mechanical screwing devices are only utilized in a few steelworks. Actual steelworks operations indicate that elements of the electrode columns still come loose repeatedly.

SUMMARY OF THE INVENTION

It is accordingly an object of the invention to provide a threaded connection for carbon and/or graphite electrode columns which overcomes the above-mentioned disadvantages of the heretofore-known devices and methods of this general type and which provides for the manufacture of parts from ceramics, preferably parts from synthetically produced carbon and graphite for a threaded connection that will prevent loosening, or at least mitigate the consequences of loosening.

With the foregoing and other objects in view there is provided, in accordance with the invention, an assembly with a threaded connection, comprising:

an outer part made from ceramic and having an internal thread;

an inner part made from ceramic and having an external thread;

the internal thread and the external thread having thread windings with a substantially uniform lead, a root and a crest, and individual thread windings with a substantially v-shaped profile;

at least one of the internal and external threads being formed with a wedge ramp at the root and, when the inner and outer parts are screwed into one another, the crests of one of the parts abut with the wedge ramps at the root of the other one of the parts; and the internal and external threads being cylindrical threads or conical threads.

In other words, the threaded connection parts are made from ceramic, preferably from synthetically produced carbon or graphite, and the threads are cylindrical or conical. When the parts of a threaded connection are engaged, the thread crests of the one part abut against the wedge ramps on the thread winding roots of the other part. This means that the load is no longer borne by the flanks of the individual thread windings of the threaded connection. Consequently, thread windings having for example a v-shaped profile and corresponding thread winding flanks can be dispensed with in the threaded connection part that has wedge ramps at its thread winding roots.

With the above and other objects in view there is also provided, in accordance with the invention, an electrode column with the above-summarized assembly and with a plurality of the outer parts formed as carbon electrodes and the inner parts formed as connecting pins screwing the electrodes together in an electrode column, and with the assembly forming a locking and load-bearing connection that is not susceptible to unscrewing.

For the purposes of the invention, the columns of carbon electrodes should not be loosened or separated from one another by the flexing moments, vibrations or impacts prevalent in steelworks operation, that the elements remained locked in contact with one another and that the threaded connection bears the load of the lower part of the column in each case, while the connecting pins hold the electrodes together.

The following definitions are used herein:

The ends of an electrode are also referred to as the end face.

A socket is a coaxial depression in the end face of an electrode. Usually cylindrical or conical internal threads are worked into the coaxial internal walls of a socket; this specification is governed by the international standard IEC 60239. (Socket with internal thread=threaded socket).

A connecting pin is a cylindrical or biconical screw having an external thread and one end face arranged perpendicularly to the axis of the connecting pin on either side thereof. A connecting pin is screwed about halfway into each socket of adjacent electrodes in order to connect the two electrodes.

A preset is an electrode and a connecting pin that is screwed partway (i.e., halfway) into a socket of the electrode.

An electrode or carbon electrode has a threaded socket on at least one end face. In this document, the connection of two electrodes by means of a connecting pin always means a threaded electrode connection. For the sake of simplicity, however, the term electrode joint is used, in the claims also.

The height of a thread winding is defined as the path of such a thread through 360° about the central longitudinal axis of either a connecting pin or an electrode socket.

The height or gradient of a thread winding is relatively small to prevent the two threaded connection components from slipping apart down the gradient. As specified in international standard IEC 60239, the gradient or height of a thread winding must be three (type T3) or four (type T4) thread windings per inch or per 25.4 mm. According to this specification, the height of the thread winding for type T3 is 8.467 mm, and for type T4 6.350 mm.

The advantage of the threaded connection made from carbon parts according to the invention is due to the uniform distribution of loads along the contact line between the thread crest of the one part on the one hand and the wedge ramp at the root of the thread winding of the other part on the other. This is demonstrated by the fact that the resultant forces vectors are approximately the same size at all points on the contact line described in the preceding.

In contrast, in the case of conventional threads without wedge ramps on the roots of the thread windings, the load is concentrated substantially on the first winding; the loads diminish on each subsequent winding.

In conventional threads without wedge ramps on the roots of the thread windings, the absolute values of loads are significantly greater on the first winding than the absolute values of the greatest loads in the case of threaded connection made from carbon parts according to the invention under otherwise similar marginal conditions, such as total loading exposure, thread size, thread gradient and suchlike. The greater absolute values in conventional threads have effects on the current loads in cases where an electrode column becomes hot due to use in a steel furnace. Differing coefficients of expansion in the connecting pins and electrodes cause the absolute values of the greatest loads to rise rapidly as the temperature of an electrode column increases.

Because of the higher absolute values of the greater loads, when the conventional threads without wedge ramps on the roots of the thread windings are used in threaded connections, a socket or connecting pin fails sooner in such a connection. On the other hand, the threaded connection made from carbon parts according to the invention is more resistant to such a failure of the socket or connecting pin due to high temperatures.

No additional process step is required in the manufacture of the carbon electrodes and connecting pins in order to provide locking of an electrode joint according to the invention. Different tooling is required, but machining is no more difficult.

Many metallic threaded connections consist of an outer part with internal thread, e.g. a metallic nut and an associated inner part with external thread, e.g. a metallic bolt. In both parts of the threaded connection, the distance between the thread windings is the same, and uniform in all cases. The individual thread winding has a substantially V-shaped profile and at least one of the parts has a wedge ramp on the root of the thread winding. According to U.S. Pat. Nos. 4,076,064 and 4,266,590, one of the components of the threaded connection in each case has wedge ramps on the roots of the thread windings in order to prevent the threaded connection from becoming loose from the screwed state and/or to ensure locking of the two threaded connection components. In attempting to understand locking and the prevention of loosening, the concept of the plastic deformability of metals is helpful. Accordingly it is possible to imagine that the thread crests of the one part of a metallic threaded connection abutted the wedge ramps of the other part and are plastically deformed when the two parts are screwed together, and that the thread crests of the one part are thereby interlocked with the wedge ramps of the other part of the metallic threaded connection.

When attempts are made to envision this principle of interlocking to a ceramic threaded connection, it is necessary first to deal with the fact that the principle breaks down. The reason for this is the brittleness of the ceramic. Under high shearing stresses, such as are engendered on the thread crests of a part when two ceramic threaded connection parts were screwed together, these ceramic crests simply break off.

Although synthetically produced carbons and graphites are also considered to be ceramics, the layered configuration of the graphite lattice in the microcrystalline region imparts the property of plastic deformability. Because of this deformability, which is also known as lubricity in the case of graphite, these ceramic crests do not simply break off. The deformability of synthetically produced carbons and graphites is supported by the finely distributed open porosity of these materials, which is in the order of 25%/vol. Small crystalline regions can be pressed into adjacent pores. It is possible to ensure that interlocking of the thread crests of one part of a threaded connection made from graphite or carbon with the wedge ramps of the other part of a threaded connection made from graphite or carbon takes place when the two parts are screwed together. This is true for parts with cylindrical or with conical left-handed or right-handed threads.

When the thread crests of the substantially v-shaped thread windings of the one threaded connection part abutt the wedge ramps of the other threaded connection part as both parts are screwed together, all the forces are transferred from the one part to the other part only at this contact line. The profile of the thread windings of the part with the wedge ramps on the root of the thread winding can be made smaller and smaller with no loss of force transfer. The consequence of this is that the flanks of the thread windings of the part with the wedge ramp no longer make contact with the flanks of the thread windings of the part with the thread windings having a substantially v-shaped cross-section, and thus also no forces are transferred via this path. The case described in claim 11 can be viewed as an interesting special case, in which the part with the wedge ramp no longer possesses any visibly projecting thread winding, see also FIG. 4. Now only the wedge ramp encircles this part. The contour of the associated thread winding has been reduced e.g. to a connecting line 9 between two wedge ramps located one above the other in the cross-section of FIG. 4.

The technique of manufacturing and using synthetically produced carbon electrodes is explained in the introductory portion. The individual elements of a column of carbon electrodes are screwed together. For this, the carbon connecting pin with the external threads engages with the sockets of two adjacent carbon electrodes furnished with internal threads.

The mechanical and thermal stresses on a column of carbon electrodes are not distributed evenly throughout an electrode and connecting pin. Instead, the connecting pin is exposed to greater loading and is therefore usually produced from a carbon material having better mechanical and thermal ratings with respect to properties such as flexional strength, modulus of elasticity, coefficient of expansion parallel and perpendicular to the central longitudinal axis, electrical and thermal conductivity, bulk density etc., than the electrodes to be screwed together.

As explained in U.S. Pat. No. 4,076,064, the threaded connection is improved if the bolt of the threaded connection is made from a harder, less ductile material than the material of the associated nut. A similar arrangement is also created in the threaded connection of the column because of the loads of the bodies of an electrode column: the connecting pin has a higher modulus of elasticity and thus is less ductile than the carbon electrode, which has a lower modulus of elasticity and thus higher ductility. It has proven to be advantageous to create the wedge ramp on the root of the thread winding of the internal thread of the more ductile electrode socket, and to leave the cross-section of the thread windings of the less ductile connecting pin unchanged.

A number of thread windings is created on the lateral surface of a connecting pin starting at the front face and extending to the mid-section of a connecting pin. The same is done with the electrode socket assigned thereto. The number of thread windings depends on the length of the connecting pin and the depth of the electrode socket and the thread gradient. This last is specified by international standard IEC 60239, also for columns of carbon electrodes.

A high locking effect is achieved when two threaded connection parts are screwed together if all thread windings of one part of a threaded connection, in this case preferably the electrode socket, are furnished with a wedge ramp on the thread winding root. In certain cases, however, it is sufficient that at least one thread winding was furnished with a wedge ramp. In other cases, the wedge ramp is present on the thread winding root on sections of the length of the thread winding, which extends from the floor of the electrode socket as far as the end face of the electrode.

Some customers purchase the electrodes in the form of presets. The connecting pin that is screwed into the first socket at one end of the electrode is attached by machine and with a correspondingly high screwing torque; the second socket at the other end of the electrode is not occupied. This means that there is practically no danger that the connecting pin screwed on by machine will come loose in steelworks operation. Consequently, the thread of the preset does not require any protection from loosening and thus no wedge ramp on the thread winding root (of the socket thread) is required. The method used to screw the second electrode end may either be performed by machine in an electric steel furnace, or screwed by hand if a corresponding machine is not available at the steelworks. Particularly in the latter case, there is a danger of loosening due to the application of an inadequate screwing torque. Particularly in these cases, it is useful to have an additional protection against loosening. The internal thread of the second electrode socket not previously screwed to a connecting pin, has a wedge ramp on the thread winding root.

On the wedge ramp on the thread winding root, usually on one of the two parts to be screwed the surface most often has a different inclination to that of the flanks. Since the flanks of the thread windings are arbitrarily inclined, it does not serve any purpose to use these flanks as references. The logical reference is the relationship between the central longitudinal axis of the connecting pin or the electrode on the one hand, and the inclination of the surface of the wedge ramp on the thread winding root on the other. The angle between the central longitudinal axis of the connecting pin or the electrode on the one hand and the inclination of the surface of the wedge ramp on the thread winding root on the other is between 10° and 60°, preferably 25° to 35°, the angle being calculated either in the clockwise or counterclockwise direction.

The projection of the wedge ramp on the thread winding root onto the central longitudinal axis of the connecting pin or the electrode is 30 to 100% as long as the height of a thread winding. This length is positioned on the root of the thread winding such that when the two threaded connection components are screwed together the wedge ramp of the first component is contacted in the middle by the crest of the thread winding of the second component. However, a problem arises in that the crests of the thread windings of the second component are forced away from the middle of the inclined surface of the wedge ramp of the first component under the load of the forces being applied.

As is indicated in one of the preceding sections on screwing carbon electrodes in an electric steel plant, the objective was to protect threaded joints consisting of carbon electrodes and carbon connecting pins against loosening despite the constraints that prevail in a steelworks. Therefore, threaded connections are used of which at least one part had a thread with a wedge ramp in the thread root of the thread winding on at least one section of the length of this thread winding. In one special case the load-bearing thread windings normally having a substantially v-shaped cross-section are not constructed with the encircling wedge ramp on at least one component. When the threaded connection consisting of carbon electrodes and carbon connecting pins is screwed together, a connection and is created that is locking, load-bearing, and resistant to loosening, thereby assuring protection of the entire electrode column.

Threaded connections of the type described have a more uniform load distribution than standard threaded connections with two threads, the thread windings of which each have v-shaped cross-sections.

Threaded connections of the type described are used as connections that are locking, load-bearing, and not susceptible to unscrewing for carbon electrodes which are screwed together in an electrode column using connecting pins, both in the standard application and in the special application cited previously with reduced contour of the thread winding.

EXAMPLES

On a screwed fixture stand manufactured by Piccardi (Dalmine(Bergamo)/Italy), known as a "nippling station" and produced in 1997, two graphite electrodes having a diameter of 600 mm were each screwed to an electrode column with suitable graphite nipple.

To do this, a preset consisting of one electrode and a nipple that had been screwed into a socket of the electrode beforehand were used. This electrode had a standard thread compliant with standard CEI IEC 60239 and a socket with designator S 317T4N. The associated nipple had a conical thread on both sides with standard designator N 317T4N. This means that the thread side of nipple that was still free in the preset was also equipped with a standard thread.

The second electrode with a diameter of 600 mm was then screwed onto this preset, and the socket of this second electrode had an wedge ramp at the base of the windings. The surface of the wedge ramp had an angle of 30° relative to the central longitudinal axis of the electrode. In order to produce this special thread in the electrode socket, a die was used whose external contour also had an angle of 30° in the places corresponding to the wedge ramps in the socket. For the rest, the contour of the die had the typical v-shaped profile, which corresponded to a cross-section through the windings of a socket thread. Various screwing tests were conducted with an electrode column arrangement of this type.

First, the threaded connection according to the invention was closed using a mechanically applied clamping torque. When a clamping torque of 4000 Nm was reached, the screwing was ended. In order to document the success of such a threaded connection, a section was made through the threaded connection according to the invention. A cut view of such kind is shown in FIG. 5. Since cut views through graphite parts are not immediately understandable to those not skilled in the art, because of the granular structure, notes regarding the substantially inventive elements have been written in this figure. A further important note is that the flanks of the thread windings of the nipple and the socket are not contiguous, and that consequently the stresses are not transferred from the nipple to the socket, but rather the crests of the thread turnings on the nipple abut the wedge ramps at the base of the thread turnings on the socket, and the stresses are transferred there.

In order to characterize the fastening security of the threaded connection, the connection was then opened again and the disengagement torque was measured. A disengagement torque of 6000 Nm was determined, which is within the normal range for standard threads.

Upon repeated screwing and disengaging operations on the same threaded connection, the screwing and disengagement torques did not change significantly.

In further tests, the threaded connection according to the invention was closed using manually applied clamping torque. In this manner, a screwing torque of about 1200 Nm was achieved. The disengagement torque was 2000 Nm. Upon repeated screwing and disengaging operations on the same threaded connection, disengagement torques between 1500 Nm and 3000 Nm were observed; the wide distribution of disengagement torques was due to the fact that various techniques were used to apply the screwing torque.

Other features which are considered as characteristic for the invention are set forth in the appended claims.

Although the invention is illustrated and described herein as embodied in a threaded connection for carbon and/or graphite electrode columns, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1A and FIG. 1B are sections taken parallel to the longitudinal axes through electrodes 1 with sockets recessed into end faces 3, either having a cylindrical or a conical internal thread, and view of the lengthwise extension of unattached connecting pins 2 with either cylindrical or conical threads.

FIG. 2 is a section on a magnified scale parallel to the longitudinal axis through an electrode 1 socket with a conical connecting pin 2 screwed into the socket of the electrode 1.

FIG. 3a) shows a section through a conventional threaded connection in the screwed state, and FIG. 3b) shows a section through a threaded connection according to the invention in the screwed state. In FIG. 3a), load vectors are drawn on the flanks of the thread windings, in FIG. 3b) these load vectors are applied to the wedge ramps on the roots of the thread windings.

FIG. 4 is a section parallel to the longitudinal axis through a part of a conically tapered threaded connection in the screwed state, wherein the one part of the threaded connection (advantageously the connecting pin 2) has thread windings with v-shaped profile, and wherein the encircling wedge ramp 7 is conformed on the other part of the threaded connection (advantageously the electrode 1 socket), and the load-bearing thread windings are not usually conformed with a substantially v-shaped profile.

DESCRIPTION OF THE PREFERRED EMBODIMENTS

Figure 1A:
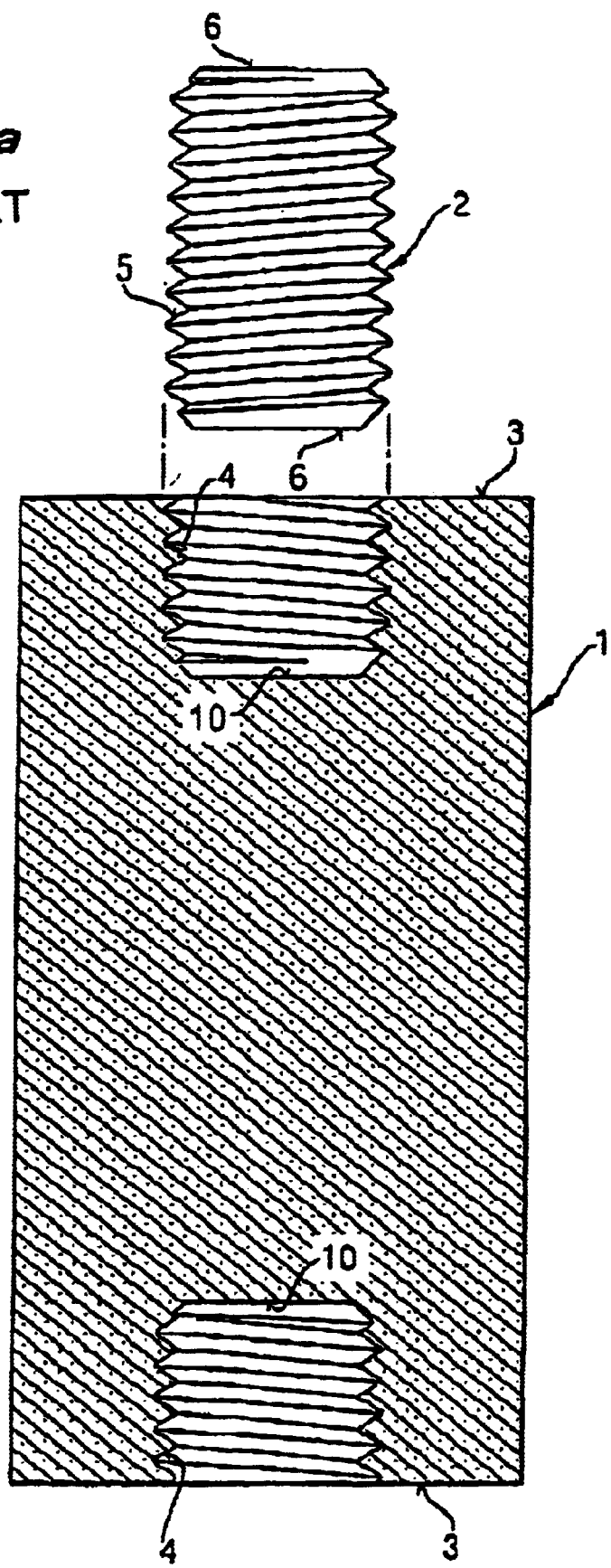

FIG. 1a and FIG. 1b provide a general view of arrangements of electrodes 1 and unattached connecting pins 2. The coaxially arranged electrode 1 sockets are furnished with thread surfaces 4. The limits of the sockets pointing towards the body of the electrodes 1 are the socket floors 10 of the electrodes 1. Unattached connecting pins 2 have thread surfaces 5 on their lateral surfaces and possess each frontal surfaces 6 on either side.

The special feature of FIG. 2 is shown on a magnified scale. The thread surface 4 of electrode socket includes not only conventional thread windings having the normal v-shaped profiles, but a wedge ramp 7 is also located on the root of the thread winding. The surface of the wedge ramp 7 on the root of a thread winding forms an angle in the range between 10° and 60°, preferably between 25° and 35° with the longitudinal axis of connecting pin 2 or electrode 1.

The crests of thread windings 8 of the one threaded connection component (connecting pin 2) abut with wedge ramps 7 on the root of the thread windings of the other threaded connection component (electrode 1). The total load of the electrode column is transferred from electrode 1 to connecting pin 2 or vice versa within the threaded connection at the encircling contact line 7–8.

Figures 3A, 3B:
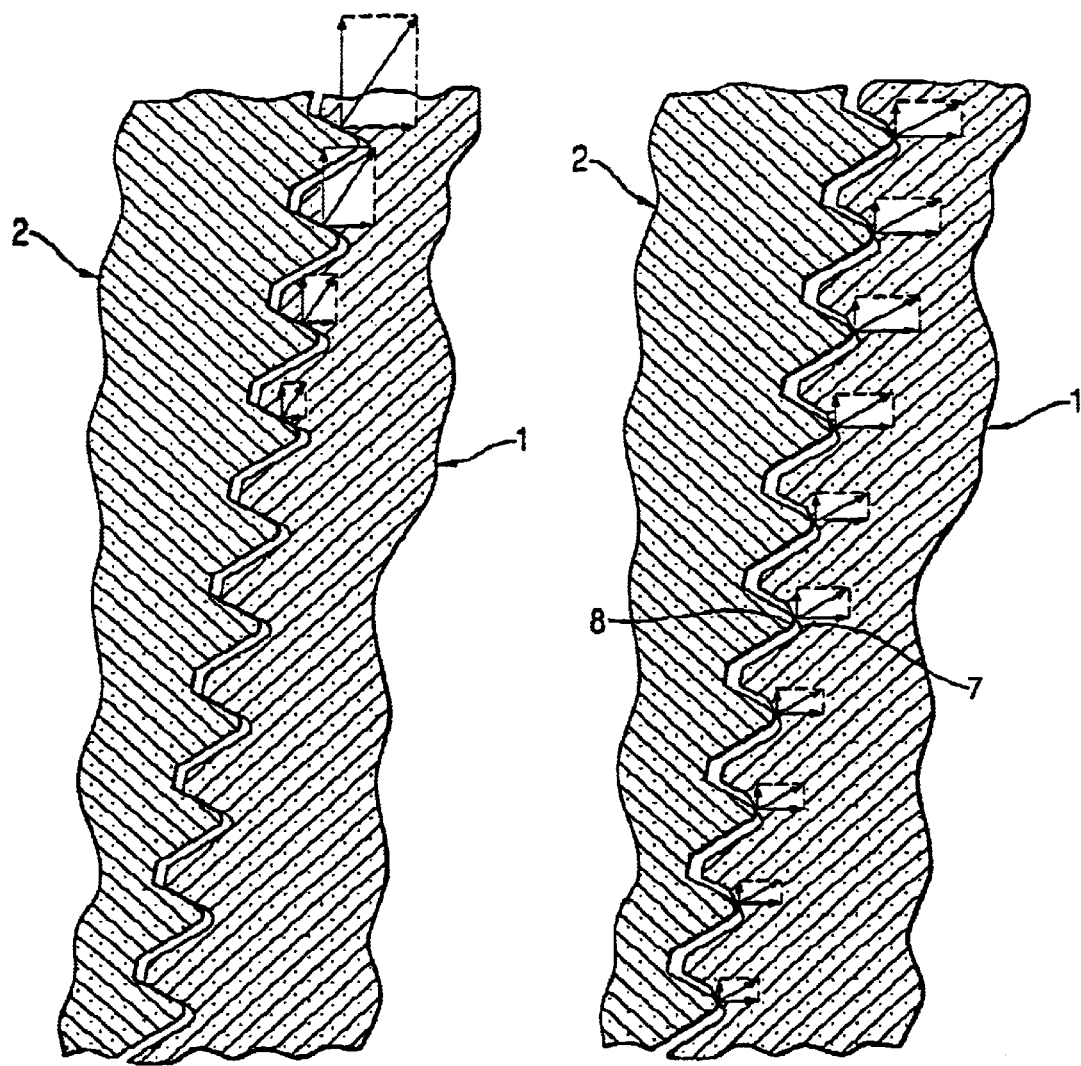
FIG. 3a and FIG. 3b show two schematic sections comparable to the view in FIG. 2 parallel to the longitudinal axes through two different threaded connections each in the screwed state.

FIG. 3a and FIG. 3b serve to illustrate the improved transfer of loads by comparison of a conventional threaded connection with a threaded connection for carbon columns according to the invention, each in the screwed state. Particularly the load vectors drawn on the flanks of the thread windings clarify the differences. In the conventional threaded connection, see FIG. 3a, the top thread winding has the largest load vector on its flank. The thread winding immediately below is subjected to a smaller load vector, the thread winding below that has a yet smaller load, and so on. The bottom thread windings barely participate in the transfer of loads from one threaded connection component to the other.

In the threaded connection for carbon electrode columns according to the invention, see FIG. 3b, the load vectors drawn on the wedge ramps 7 on the roots of the thread windings are of practically equal size for all wedge ramps. This means that an approximately equal share of the load is transferred at each contact from the crest of the thread winding 8 of the one threaded connection component (connecting pin 2) to the wedge ramp 7 on the root of the thread winding of the other threaded connection component (electrode 1).

As in FIGS. 3a) and 3b) and the enlarged section in FIG. 2, FIG. 4 shows a section parallel to the longitudinal axis through a component of a threaded connection in the screwed state, wherein the threaded connection shown in FIG. 4 is tapered (towards the bottom of the figure). Since the flanks of the thread windings of the threaded connection component, which also has the encircling wedge ramp 7 (electrode 1) do not transfer any load, in this threaded connection component (electrode 1) the thread windings with v-shaped profile could be dispensed with. A simple connecting line 9—shown in cross-section in FIG. 4—between each of two wedge ramps 7 now replaces the thread winding with v-shaped profile, and in the physical embodiment of an electrode socket corresponds to a helicoidal surface having an inclination towards central longitudinal axis 11 of the electrode (socket).

Figure 5:
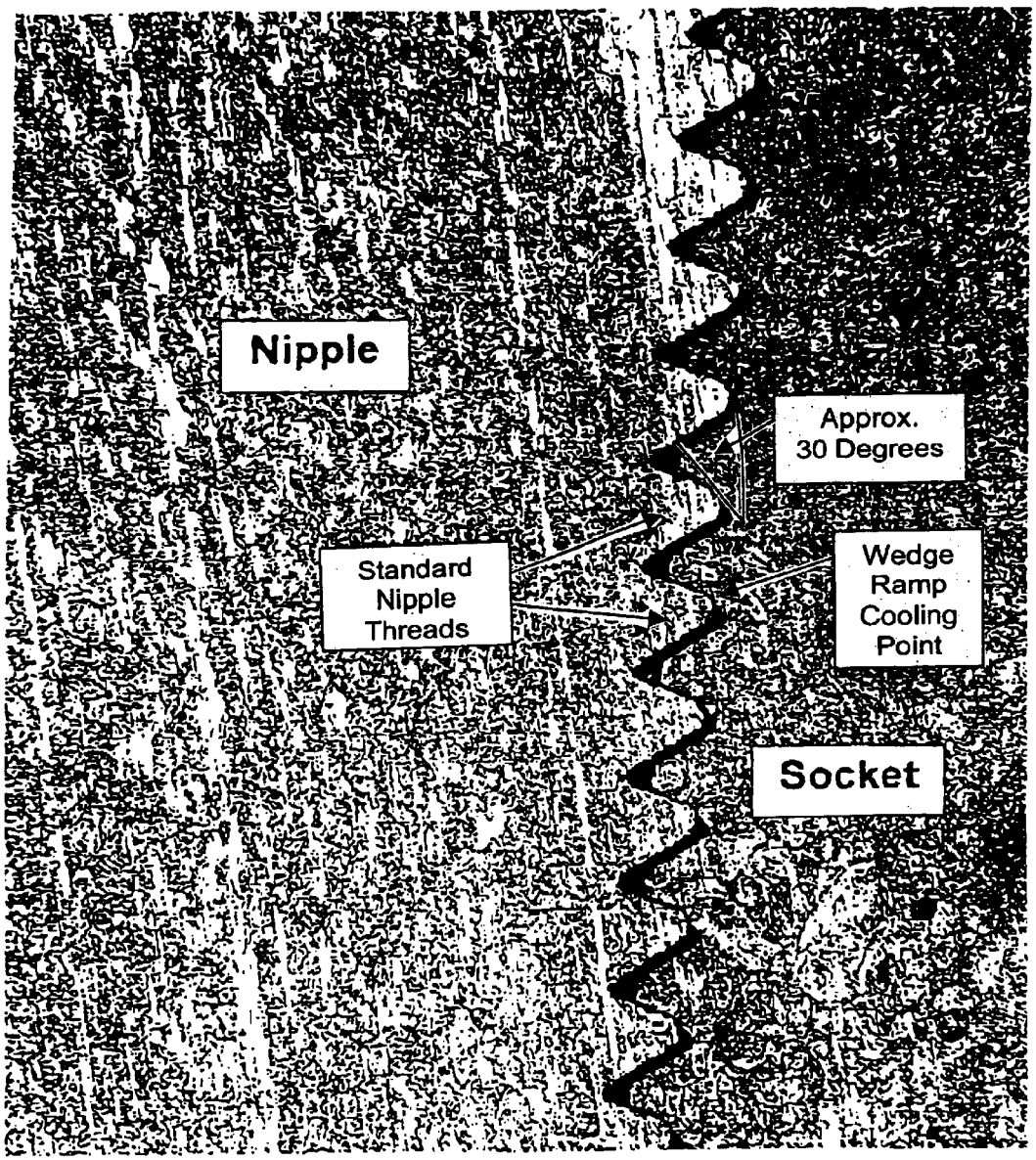
FIG. 5 is a section through a threaded connection of a nipple and an electrode which connection is according to the invention.

FIG. 5 shows a section through a threaded connection in the screwed state. On the right side a part of the socket of the electrode 1 is to be seen, including the threads with wedge ramps 7 on the root of a thread winding. The surfaces of the wedge ramps 7 have approximately 30° inclination compared to the central longitudinal axis of the electrode 1. On the left side a part of the connecting pin 2 and standard threads are to be seen. The crests 8 of the connecting pin 2 standard thread windings contact the wedge ramps 7 on the root of the electrode 1 thread winding. The flanks of the threads of connecting pin 2 and electrode 1 do not contact.

We claim:

1. An assembly with a threaded connection, comprising:
    an outer part made from ceramic and having an internal thread;
    an inner part made from ceramic and having an external thread;
    said internal thread and said external thread, each having thread windings with a substantially uniform lead, a root, crests, flanks and at least one of said thread windings having a substantially v-shaped profile;
    at least one of said internal and external threads being formed with a wedge ramp at said root and, when said inner and outer parts are screwed into one another, said crests of one of said parts abut against said wedge ramps at said root of the other one of said parts for defining a gap between said flanks of said thread windings of said internal and external threads; and
    said internal and external threads being cylindrical threads or conical threads.

2. The assembly according to claim 1, wherein said inner and outer parts are made from synthetically produced carbon or graphite.

3. The assembly according to claim 1, wherein said outer part is a carbon electrode with a socket and an internal thread formed therein, and said inner part is a carbon connecting pin with said external thread for connecting two said electrodes.

4. The assembly according to claim 3, wherein said wedge ramp is disposed on said root of said thread winding of said internal thread of said carbon electrode, and said carbon electrode has a lower modulus of elasticity than said carbon connecting pin.

5. The assembly according to claim 1, wherein at least one winding of a respective said thread is formed with a wedge ramp on said root.

6. The assembly according to claim 5, wherein said wedge ramp on said root of a thread winding is formed on sections of a length of said thread winding.

7. The assembly according to claim 3, wherein, in a preset with an electrode forming said outer part and a connecting pin forming said inner part partly screwed into said electrode, said wedge ramp on said root of a thread winding is only applied on said internal thread of the electrode socket that has not been screwed together with a connecting pin beforehand.

8. The assembly according to claim 3, wherein a surface of the wedge ramp on said root of a thread winding defines an angle in a range between 10° and 60° with a longitudinal axis of said connecting pin or said electrode.

9. The assembly according to claim 8, wherein said angle lies in a range between 25° and 35°.

10. The assembly according to claim 8, wherein said angle between said wedge ramp on said root of a thread winding and said longitudinal axis is calculated in a clockwise or a counterclockwise direction.

11. The assembly according to claim 1, wherein a projection of said wedge ramp onto a central longitudinal axis of said connecting pin or said electrode is 30 to 100% as long as a height of said thread winding, and a length of said projection is positioned on said root of said thread winding such that when the threaded connection components are screwed together, said wedge ramp of the first component is contacted in a center by said crest of said thread winding of said second component.

12. An electrode column, comprising the assembly according to claim 1 with a plurality of said outer parts formed as carbon electrodes and said inner parts formed as connecting pins screwing said electrodes together in an electrode column, and with the assembly forming a locking and load-bearing connection that is not susceptible to unscrewing.

13. A threaded connection assembly, comprising:
    first and second parts formed with threads and including an outer part with an internal thread and an associated inner part with an external thread;
    said threads of said first and second parts having a uniform lead;

an individual thread winding of said first part having a substantially v-shaped profile and an individual thread winding of said second part being formed with an encircling wedge ramp in the nature of a thread, wherein, when said first and second parts are screwed into one another, thread winding crests of said first part abut with said encircling wedge ramp on said second part for defining a gap between flanks of said thread windings of said internal and external threads; and wherein load-bearing thread windings of said thread windings are not usually conformed with said substantially v-shaped profile.

14. An electrode column, comprising the threaded connection assembly according to claim 13 with a plurality of said outer parts formed as carbon electrodes and said inner parts formed as connecting pins screwing said electrodes together in an electrode column, and with the assembly forming a locking and load-bearing connection that is not susceptible to unscrewing.

15. The assembly according to claim 1, wherein said crests of one of said parts abuts with less than 10% of the surface of said wedge at said root of the other one of said parts.

* * * * *